United States Patent Office

Re. 24,062
Reissued Sept. 20, 1955

24,062

PROCESS FOR TREATING POLYETHYLENE AND COATED PRODUCT

Paul V. Horton, Poughkeepsie, N. Y., assignor to Plax Corporation, Hartford, Conn., a corporation of Delaware No Drawing. Original No. 2,668,134, dated February 2, 1954, Serial No. 47,147, August 31, 1948. Application for reissue August 19, 1954, Serial No. 451,079

11 Claims. (Cl. 154—139)

Matter enclosed in heavy brackets [ ] appears in the original patent but forms no part of this reissue specification; matter printed in italics indicates the additions made by reissue.

This invention relates to the preparation of polyethylene articles for cementing or printing, and more particularly to the oxidation of the normally hydrophobic surfaces of the articles so that they are hypophilic and free of static charge.

Heretofore, difficulty has been experienced in cementing polyethylene products and in printing legends thereon, the normally hydrophobic surface of polyethylene being unreceptive to most glues, adhesives and printing inks and dyes.

In accordance with the present invention, polyethylene surfaces readily may be made hydrophilic and adaptable to cementing and printing by oxidation with a strong sulphuric acid-dichromate solution which may be obtained by saturating concentrated sulphuric acid with technical sodium dichromate. The surface is prepared simply by passing it through a bath of the oxidizing solution and then washing in water and drying.

In the case of polyethylene sheet and similar products which are formed by continuous processes, as for example, extrusion, the surface treatment of the present invention may be integrated in the continuous production so as continuously to produce a product having a hydrophilic surface.

The degree of treatment or modification of the normally hydrophobic surface can be regulated by varying the temperature and strength of the acid-dichromate solution and the exposure time of the surface to the solution. With strong solution at room temperature (70° F.) the treatment is practically instantaneous in rendering the surface hydrophilic.

The subsequent washing of the treated surface immediately and completely removes any sulphuric acid products which may have adhered to the polyethylene chain as a result of the sulphuric acid-dichromate treatment. Water is found to spread evenly over a polyethylene surface treated in this way instead of gathering in drops as in the case of an untreated surface. Subsequent exposure of a treated surface to water does not wash away or destroy the hydrophilic character of the treated surface. The treated surface will take up basic dyes from an aqueous solution, while adhesives and cements based on polyvinyl alcohol, polyvinyl acetate, nitro cellulose, gelatin, Hycar rubber and similar polar compounds adhere readily to such a surface. Hycar rubber is the name given by B. F. Goodrich Company to a synthetic rubber compound that is a butadiene copolymer of undisclosed composition. Solvents which migrate readily through polyethylene as, for example, methyl ethyl ketone, can be used as solvents for the cement.

It will be obvious that the whole of the surface of the polyethylene article need not be treated with the acid-dichromate but that areas of various shapes or forms can be subjected to the action of the solution. In this way it is possible to form letters and other shapes on polyethylene by subjecting such treated areas to the action of dyes or aqueous inks. A treated surface can be printed on quite successfully with nitro cellulose lacquer. If the printed surface is submerged in water for an hour, the printing can be scratched off, but will not be damaged by rubbing.

The treatment does not impair the optical properties of the sheet and, in fact, has been found to improve considerably the transparency or clarity of polyethylene.

Metals may be easily deposited on such treated surfaces by allowing the surface to come into contact with an aqueous solution of a readily-reducible metal salt and reducing the metallic salt. Thin films of copper and silver may be deposited in this manner. Metals may also be applied to the treated surface by the process of low vacuum volatilisation. Better adhesion is obtained when the metals are applied to treated, as compared with untreated, polyethylene surfaces.

It will be understood that the polyethylene treatment of the present invention may be used wherever the hydrophilic property is required or helpful. For example, the interior of polyethylene bottles treated with the acid-dichromate has been successfully given an adherent oil resistant film of polyvinyl alcohol. It was found that the adherence of the film was great enough to tear the surface of the polyethylene.

It also has been found that electrostatic charges do not accumulate on polyethylene surfaces treated according to the process of the present invention and polyethylene thus treated can advantageously be used in the manufacture of covers, for instruments, dials, gauges, indicators and the like, especially those in which accumulation of electrostatic charges on the cover has a disturbing influence on the instrument itself.

I claim:

1. The process of treating polyethylene products which comprises exposing the product to a saturated solution of sodium dichromate in concentrated sulphuric acid to render the surface of the polyethylene hydrophilic, receptive to printing ink, and free of static electricity.

2. The process of treating polyethylene products which comprises exposing the product to a bath of sulphuric acid and sodium dichromate, washing the product in water and drying.

3. The process recited in claim 2 wherein the product is exposed only instantaneously to the acid-dichromate.

4. The process recited in claim 2 and including exposing the product to a dye.

5. The process of treating polyethylene products which comprises exposing the product to a bath of sulphuric acid and sodium dichromate, washing, drying, and applying a nitro cellulose lacquer.

6. The process of bonding a polyethylene surface to another surface which comprises exposing the polyethylene surface to a bath of sulphuric acid and sodium dichromate, washing, and bonding the surfaces together with a polar cement.

7. Solid polyethylene having a surface which is hydrophilic, receptive to printing inks, and free of static charge, said surface comprising essentially oxdized polyethylene.

*8. Solid polyethylene having an ink receptive hydrophilic surface free of static charge, said surface comprising essentially oxidized polyethylene having an adherent film of a polar compound.*

*9. An article as recited in claim 8 and wherein the polyethylene is in the form of a hollow container and the oxidized polyethylene surface having the adherent film is the interior surface of the container.*

*10. A polyethylene bottle the inner surface of which comprises polar compound receptive oxidized polyethyl-*

*ene and which surface has an adherent film of an oil resistant polar compound.*

*11. A polyethylene article, a surface of which comprises polar compound receptive, oxidized polyethylene and which surface has an adherent film of an oil resistant polar compound.*

References Cited in the file of this patent or the original patent

UNITED STATES PATENTS

| | | |
|---|---|---|
| 2,125,374 | Herman et al. | Aug. 2, 1938 |
| 2,153,553 | Fawcet et al. | Apr. 11, 1939 |
| 2,215,196 | Schlack | Sept. 17, 1940 |
| 2,341,885 | Sowa | Feb. 15, 1944 |
| 2,400,720 | Standinger et al. | May 21, 1946 |
| 2,413,789 | Scheiderbauer | Jan. 7, 1947 |
| 2,418,018 | Erusberger et al. | Mar. 25, 1947 |
| 2,431,042 | Ingersoll | Nov. 18, 1947 |
| 2,431,956 | Moody | Dec. 2, 1947 |
| 2,446,536 | Hardy | Aug. 10, 1948 |
| 2,584,722 | London | Feb. 5, 1952 |

OTHER REFERENCES

British Plastics, "Properties and Uses of Polythene," Richards, April 1945, pp. 146 to 151.

"Modern Inorganic Chemistry," Mellor, 1917, p. 465.

Industrial and Engineering Chem., Polythene, June 1945, pp. 526–33.

British Plastics, "Properties and Uses of Polythene," Midwinter, May 1945, pp. 208–228.